United States Patent

Di Matteo, Sr. et al.

[11] 3,730,020
[45] May 1, 1973

[54] CONNECTING ROD AND CAP CONSTRUCTION

[76] Inventors: Vincent J. Di Matteo, Sr.; Bartolo Di Matteo; Vincent J. Di Matteo, Jr., all of 7415 8th Avenue, Los Angeles, Calif. 90043

[22] Filed: Oct. 13, 1971

[21] Appl. No.: 188,867

[52] U.S. Cl. ............................................. 74/579 E
[51] Int. Cl. ............................................. F16c 7/00
[58] Field of Search ..................... 74/579 E, 579 R; 184/6.5, 40; 308/167

[56] References Cited

UNITED STATES PATENTS

| | | | |
|---|---|---|---|
| 1,981,609 | 11/1934 | Berland | 74/579 E |
| 1,791,187 | 2/1931 | Brauchler | 74/579 E |
| 3,482,468 | 12/1969 | De Biasse | 74/579 |

*Primary Examiner*—Charles J. Myhre
*Assistant Examiner*—F. D. Shoemaker
*Attorney*—Harvey B. Jacobson

[57] ABSTRACT

An aluminum connecting rod including an elongated shank portion having wrist pin bearing defining means at one end and a removable cap portion at the other end. The cap portion and adjacent end of the elongated shank portion coact to define a bearing bore and include opposing parting surfaces disposed on opposite sides of the bore with at least one elongated tension member extending between each pair of opposing parting surfaces and clamping the cap to the adjacent end of the shank. The opposite side outer boundary surfaces of the cap and shank portions defining the aforementioned bearing bore include generally radial oil relief grooves, the shank portion includes a center longitudinal oval passage communicating the bearing bore and the wrist pin bearing defining structure and the shank portion includes a central longitudinal zone thereof through which the aforementioned oil passage extends and which tapers in at least one transverse dimension away from the aforementioned bearing bore.

8 Claims, 5 Drawing Figures

Patented May 1, 1973  3,730,020

CONNECTING ROD AND CAP CONSTRUCTION

The connecting rod and cap construction of the instant invention has been specifically designed for use in automotive engines operating at extreme high R.P.M.'s, on the order of 7,500 to 9,500 r.p.m. or more. In addition, these high speed engines are supercharged to an excessive extent whereby the air and fuel mixture is supplied to the intake passage of the engine pressure approaching 22 pounds per square inch.

While operating under such extreme high r.p.m. conditions and under excessive supercharging pressures connecting rods and caps are subject to extreme combustion forces and stresses, inertia forces and reciprocating forces. In order for connecting rods and caps to operate under excessively high engine speed conditions, a lightweight metal such as aluminum must be used in the construction of the connecting rods. Aluminum has been generally accepted as the preferred lightweight metal from which to construct lightweight high performance connecting rods, but it has been found that aluminum connecting rods, when operating under extreme engine speed and power conditions, experience harmonics which can become excessive and cause the rod to bend and eventually break.

The rod of the instant invention is formed by conventional three die forging in order to arrange the grain of the metal lengthwise of the shank portion of the rod and peripherally about the bearing bore defined by the adjacent portions of the cap and shank portion. Further, the area of the shank centrally intermediate its opposite end includes a lengthwise extending portion which tapers toward the wrist pin end of the rod in order to reduce harmonics. In addition, the outer boundary surfaces of the cap and adjacent portions of the shank portion at opposite ends of the bearing bore at the cap end of the rod are provided with radial oil relief grooves.

The main object of this invention is to provide a connecting rod and cap construction constructed sufficiently light to be utilized in high speed engines and of a configuration inherently reinforcing the rod against harmonics.

Another object of this invention, in accordance with the immediately preceding object, is to provide a connecting rod and cap construction with the grain of the metal extending lengthwise of the shank portion of the rod and peripherally about the bearing bore defined at the cap end of the rod.

Still another object of this invention is to provide a connecting rod and a cap construction including opposite side outer boundary surface grooves at the ends of the bearing bore formed through the cap end of the rod for free discharge of high flow lubricating oil from the cap end of the rod.

The final object of this invention to be specifically enumerated herein is to provide a connecting rod and a cap construction in accordance with the preceding objects which will conform to conventional forms of manufacture, be of simple construction and conventional in overall design so as to provide a device that will be economically feasible, long lasting and readily adaptable for use in substantially all reciprocating piston internal combustion engines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
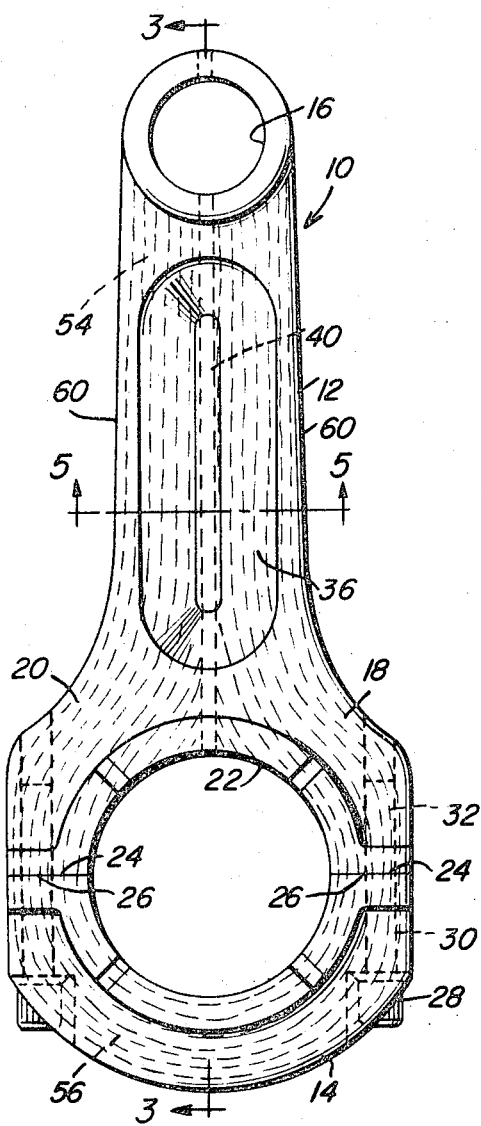
FIG. 1 is a side elevational view of a connecting rod and cap construction in accordance with the present invention.
Figure 2:
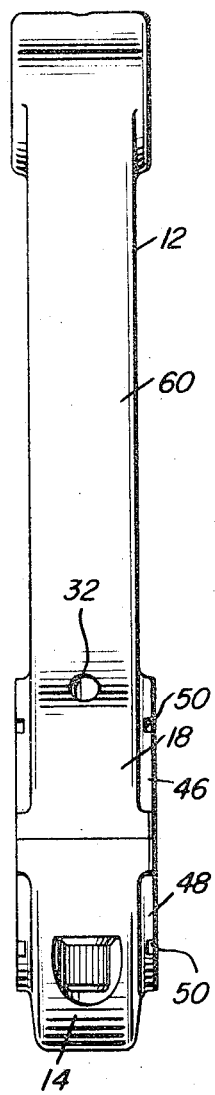
FIG. 2 is an edge elevational view of the assemblage illustrated in FIG. 1 and as seen from the right side thereof.

Referring now more specifically to the drawings, the numeral 10 generally designates the connecting rod and the cap construction of the instant invention. The construction 10 includes an elongated shank portion 12 and a cap 14. One end of the shank portion 12 has a transverse bore 16 formed therethrough defining a wrist pin bore and the opposite end of the shank portion 12 includes opposite side blocks 18 and 20 defining a half cylindrical bearing surface 22 therebetween.

The cap 14 is arcuate in configuration and includes a pair of opposite end parting surfaces 24 which abut against corresponding parting surfaces 26 on the side blocks 18 and 20, the surfaces 24 and 26 being coplanar. Of course, cap screws 28 or other suitable fasteners are passed through bores 30 formed in the opposite ends of the cap 14 and are threadedly engaged in bores 32 formed through the side blocks 18 and 20 in order to clampingly secure the cap 14 to the side block end of the shank portion 12. In addition, it may be seen that the shank portion 12 includes a longitudinal center passage 34 which opens through the center of the semicylindrical surface 22 at one end and into the transverse bore 16 at the other end.

Figure 3:
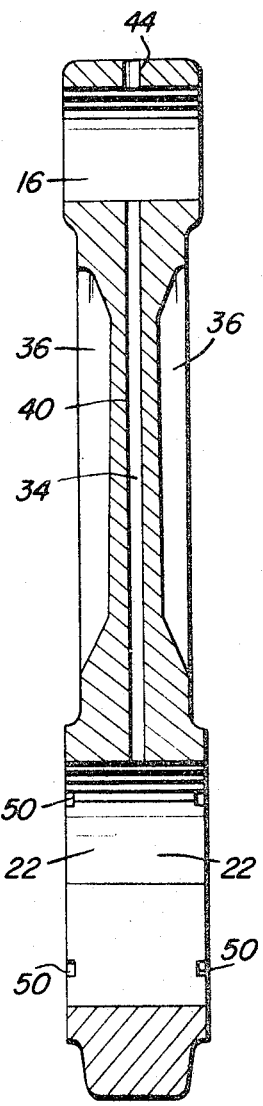
FIG. 3 is a longitudinal sectional view taken substantially upon the plane indicated by the section line 3—3 of FIG. 1.
Figure 4:
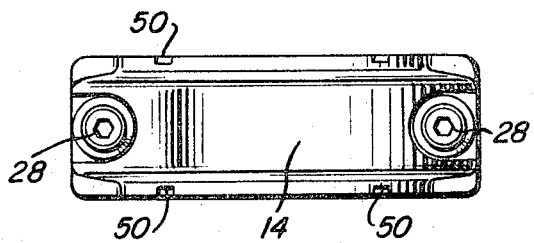
FIG. 4 is an end elevational view of the assemblage illustrated in FIG. 1 as seen from the lower side thereof.

The opposite sides of the shank portion 12 include laterally outwardly opening longitudinally extending recesses 36 which are generally truncated coneshaped in cross-section with their major width base edge portions disposed outermost. The passage 34 is centrally spaced between the minor width inner portions 38 of the recesses 36, but, with attention invited to FIG. 3 of the drawings, it will be noted that the depth of the recesses 36 gradually increases toward the end of the shank portion 12 having the transverse bore 16 formed therethrough whereby the thickness of the remaining center core 40 of the shank portion through which the bore 34 extends tapers toward the transverse bore 16. This taper of the core 40 is extremely important in that the tendency for the connecting rod shank portion 12 to experience harmonics while operating under extreme stresses and high speed conditions is substantially eliminated. Thus, excessive bending stresses of the shank portion 12 are not experienced with the result that bending and subsequent breakage of the rod shank portion 12 is not experienced, even when the connecting rod and cap construction is utilized in a highly modified supercharged racing engine.

In order to provide additional relief for lubricating oil from the transverse bore 16, that portion of the shank portion 12 defining the side of the transverse bore 16 remote from the cap 14 includes a short radial bore 44 aligned with the passage 34. The lubricating oil discharged through the bore 44 is of course directed into the associated piston and against the inner surface of the head of the piston for cooling purposes. Further, the outer boundary surfaces 46 and 48 of the shank portion and cap 14 are provided with radial oil relief grooves 50 whereby lubricating oil being discharged from the bearing bore may be readily relieved.

From FIG. 1 of the drawings it may be seen that the shank portion 12 has a grain direction designated by the phantom lines 54 which extends longitudinally of the shank portion 12 and then peripherally about and through the side blocks 18 and 20 defining the semi-cylindrical bearing surface 22. Further, these flow lines 54 are achieved by close die forging of the shank portion 12. On the other hand, the cap 14 includes peripherally extending grain designated by the phantom lines 56 and is formed by one die forging.

Figure 5:
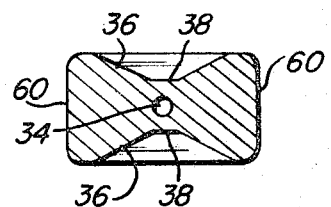
FIG. 5 is a transverse sectional view taken substantially upon the plane indicated by the section line 5—5 of FIG. 1.

With attention again invited to FIGS. 3 and 5 of the drawings, it will be noted that the cross-sectional shape of the shank portion 12, exclusive of the recesses 36, is rectangular. Further, it may be seen from FIG. 1 of the drawings that the side edges 60 of the shank portion 12 are slightly convergent toward the transverse bore 16 and this tapering of the side edges 60 together with the tapering of the core 40 distributes the extreme stresses placed upon the connecting rod and cap construction 10 while operating under high speeds in a manner to greatly reduce the tendency of harmonics to be set up due to the extreme loads, stresses and inertia and reciprocating forces applied on the rod. This, combined with the lightness of the aluminum rod and cap construction provides a connecting rod assembly that is capable of functioning under extreme loads and at extremely high R.P.M.'s without bending leading to subsequent breakage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A connecting rod and cap construction including an elongated shank portion having wrist pin bearing journal defining means at one end and laterally outwardly projecting spaced side block portions at the other end defining a semi-cylindrical bearing surface opening endwise outwardly of said other end, an arcuate end cap having its opposite ends secured to said side blocks and defining a second semi-cylindrical bearing surface opposing and opening toward the first mentioned bearing surface whereby to form a cylindrical bearing bore therewith, said construction defining opposite side annular outer boundary surfaces extending about the opposite ends of said bearing bore and disposed in parallel planes normal to the center axis of said bore, said surfaces including circumferentially spaced generally radially extending lubricating oil relief grooves.

2. A connecting rod and cap construction including an elongated shank portion having wrist pin bearing journal defining means at one end and laterally outwardly projecting spaced side block portions at the other end defining a semi-cylindrical bearing surface opening endwise outwardly of said other end, an arcuate end cap having its opposite ends secured to said side blocks and defining a second semi-cylindrical bearing surface opposing and opening toward the first mentioned bearing surface whereby to form a cylindrical bearing bore therewith, said shank portion and cap being die forged of metal and the grain of the metal of said shank portion extends longitudinally thereof and diverges on opposite sides of the center line of the shank portion into the side blocks and toward the surfaces of said blocks abutted against the opposite ends of said cap, the grain of the metal of said cap extending longitudinally thereof throughout the arcuate extent of said cap and terminating at generally right angles relative to the surfaces of said side blocks against which the ends of the cap are abutted.

3. A connecting rod and cap construction including an elongated shank portion having wrist pin bearing journal defining means at one end and laterally outwardly projecting spaced side block portions at the other end defining a semi-cylindrical bearings surface opening endwise outwardly of said other end, an arcuate end cap having its opposite ends secured to said side blocks and defining a second semi-cylindrical bearing surface opposing and opening toward the first mentioned bearing surface whereby to form a cylindrical bearing bore therewith, said rod being die forged, said shank portion being generally rectangular in cross-sectional shape and the portion thereof centrally intermediate its opposite ends includes longitudinally extending opposite side recesses formed in the larger width sides thereof, the depth of said recesses increasing toward said one end of said shank portion and said core thereby tapering toward said one end of said shank portion, said recesses being generally truncated cone shaped in cross-section with their minor dimension sides disposed innermost and spaced apart to define a central core of said shank portion therebetween.

4. The combination of claim 3 wherein the narrow width sides of said shank portion converge at least slightly toward one end of said shank portion.

5. The combination of claim 3 wherein said core includes a longitudinal central passage extending therethrough one end of said passage opening into said wrist pin bearing journal defining means and the other end of said passage opening into said bearing bore.

6. The combination of claim 5 wherein the narrow width sides of said rectangular shank portion converge at least slightly toward said one end of said shank portion.

7. A connecting rod and cap construction including an elongated shank portion having wrist pin bearing journal defining means at one end and laterally outwardly projecting spaced side block portions at the other end defining a semi-cylindrical bearing surface opening endwise outwardly of said other end, an arcuate end cap having its opposite ends secured to said side blocks and defining a second semi-cylindrical bearing surface opposing and opening toward the first mentioned bearing surface whereby to form a cylindrical bearing bore therewith, said shank portion being generally rectangular in cross-sectional shape and the portion thereof centrally intermediate its opposite ends includes longitudinally extending opposite side recesses formed in the larger width sides thereof, said recesses being generally truncated cone shaped in cross-section with their minor dimension sides innermost and spaced apart to define a central core of said shank portion therebetween, the depth of said recesses increasing toward said one end of said shank portion and said core thereby tapering toward said one end of said shank portion, said core including a longitudinal central passage extending therethrough one end of said passage opening into said wrist pin bearing journal defining means and the other end of said passage opening into said bearing bore, the narrow width sides of said rectangular shank portion converging at least slightly toward said one end of said shank portion, said shank portion and cap being formed of metal and the grain of the metal of said shank portion extends longitudinally thereof and diverges on opposite sides of the center line of the shank portion into the side blocks and toward the surfaces of said side blocks abutted against the opposite ends of said cap, the grain of the metal of said cap extending longitudinally thereof.

8. The combination of claim 7 wherein said construction defines opposite side annular outer boundary surfaces extending about the opposite ends of said bearing bore and disposed in parallel planes normal to the center axis of said bore, said surfaces including circumferentially spaced generally radially extending lubricating oil relief grooves.

* * * * *